United States Patent Office 3,479,371
Patented Nov. 18, 1969

3,479,371
**3-[(1-CYANO-2-LOWER ALKYL)AMINO]-
2-HYDROXYPROPOXYINDOLES**
Franz Troxler and Albert Hofmann, Bottmingen, Switzerland, assignors to Sandoz Ltd., also known as Sandoz A.G., Basel, Switzerland
No Drawing. Filed Dec. 11, 1967, Ser. No. 689,346
Claims priority, application Switzerland, Dec. 13, 1966, 17,757/66
Int. Cl. C07d 27/56; A61k 27/00
U.S. Cl. 260—326.15                                     6 Claims

ABSTRACT OF THE DISCLOSURE

The invention provides a compound of the formula:

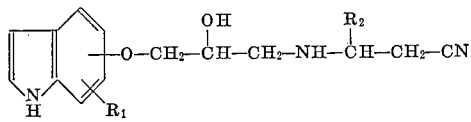

in which $R_1$ is hydrogen or methyl in the ortho position relative to the oxygen atom, either the 5 or 6 position of the indole structure being occupied by hydrogen when $R_1$ is methyl, and $R_2$ is lower alkyl of 1 to 4 carbon atoms, and a pharmaceutically acceptable acid addition salt thereof.

In general, the compounds have a blocking effect on the β receptors of the sympathetic nervous system.

---

The present invention relates to new heterocyclic compounds and a process for their production.

The present invention provides indole derivatives of Formula I,

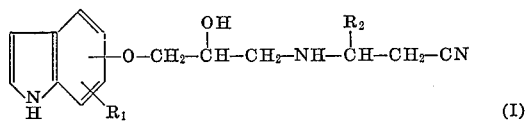

in which $R_1$ signifies hydrogen or a methyl radical in the ortho position relative to the oxygen atom, either the 5 or 6 position of the indole structure being occupied by hydrogen when $R_1$ signifies methyl, and $R_2$ signifies a lower alkyl radical of 1 to 4 carbon atoms, and their acid addition salts.

The present invention further provides a process for the production of compounds of Formula I and their acid addition salts, characterized in that a hydroxy-indole of Formula II,

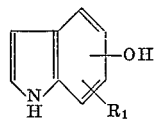

in which $R_1$ has the above significance, is reacted in alkaline medium and in the absence of oxygen with a compound of Formula III,

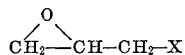

in which X signifies chlorine, bromine or iodine, the reaction product is heated with an aminonitrile of Formula IV,

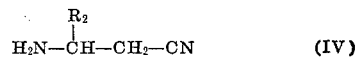

in which $R_2$ has the above significance, and, where an acid addition salt is required, the resulting compound is reacted with an inorganic or organic acid.

One preferred method of effecting the process of the invention is as follows:

The hydroxy-indole of Formula II, e.g. 4-hydroxyindole, 6-hydroxy-indole or 4-hydroxy-5-methylindole, is used in the form of an alkali metal or ammonium salt, preferably as the sodium salt. For this purpose the hydroxy-indole is added to an equimolar aqueous solution of an alkali hydroxide or ammonia, or is reacted in an organic solvent which is inert under the reaction conditions, e.g. benzene or toluene, with an equimolar amount of an alkali metal alcoholate, amide or hydride. In accordance with another embodiment of the process the alcoholic solution of an alkali metal salt of the hydroxyindole II is evaporated to dryness, and the residue is suspended in an inert organic solvent, e.g. dimethoxyethane. 1 to 5 equivalents of a compound of Formula III, e.g. epichlorhydrin, are added to the resulting solution or suspension of the hydroxy-indole salt, and the mixture is stirred for an extended period, e.g. 24 hours, at room temperature. Hydroxy-indoles are extremely sensitive to oxidation in alkaline medium, so that the reaction must be effected in complete absence of oxygen. The above reaction steps are, therefore, preferably effected in an atmosphere of nitrogen.

Working up may be effected by shaking out the reaction mixture several times from water and a water-immiscible organic solvent, e.g. methylene chloride, and subsequently separating the organic phases, drying (e.g. over magnesium sulphate) and concentrating by evaporation.

Since the compounds of Formula III have two reactive positions in their molecule, the above reaction may yield a mixture of two reaction products. During the further course of the process, however, the two possible components yield the same final product, so that it is not necessary to effect a separation of any mixtures which may result.

The reaction of the reaction product obtained above with the aminonitrile of Formula IV, e.g. 3-aminobutyronitrile, is preferably effected in an organic solvent which is inert under the reaction conditions, e.g. benzene, toluene or dioxane, and has a duration of about 2 to 20 hours. The reaction temperature ranges from 50° to 120° C., the reaction being preferably effected at the boiling temperature of the solvent under reflux. The addition of an acid-binding agent, e.g. an inorganic base such as potassium carbonate, or a tertiary organic base such as pyridine or triethylamine, is advantageous but not essential.

After the reaction has been completed, the reaction mixture may, for example, be concentrated by evaporation, the residue is shaken out between an aqueous acid, e.g. 1 N tartaric acid, and an organic solvent which is immiscible with the aqueous acid, e.g. ethyl acetate, the acid aqueous phase is made alkaline, e.g. with an aqueous solution of an alkali hydroxide. The liberated basic product is taken up in a suitable organic solvent, e.g. methylene chloride, and the separated and dried organic phase is finally concentrated by evaporation at reduced pressure. The crude product obtained as residue may subsequently be purified in manner known per se, e.g. by crystallization or adsorption chromatography.

The compounds of Formula I have two asymmetric carbon atoms in their molecule and may therefore be obtained in two racemic forms. When the compounds of Formula III and the aminonitriles of Formula IV used as starting materials for the production of compounds of Formula I are used in racemic form, the products of Formula I are obtained in the form of mixtures of the two possible racemates. These mixtures may be separated in manner known per se, e.g. by fractional crystallization. When one of the starting materials III and IV is used as racemate and the other is in optically uniform, the product of Formula I is obtained in the form of a diastereomeric mixture; the optically uniform compounds of Formula I are obtained when both starting materials III and IV are used in optically uniform form.

The compounds of Formula I are basic, crystalline or oily compounds which are practically insoluble in water, but fairly or readily soluble in most organic solvents and in aqueous solutions of organic or inorganic acids. With Keller's reagent (glacial acetic acid containing iron-III-chloride and concentrated sulphuric acid) and Van Urk's reagent (p-dimethylaminobenzaldehyde and dilute sulphuric acid) they generally give characteristic colour reactions. With inorganic acids, e.g. hydrochloric, hydrobromic or sulphuric acid, or with organic acids, e.g. oxalic, fumaric, maleic, tartaric, benzoic acid, methane-, ethane- or p-toluene-sulphonic acid, or N-cyclohexylsulphamic acid, they form stable salts which are generally water-soluble.

Hydroxy-indoles of Formula II, in which $R_1$ signifies a methyl radical in ortho position relative to the hydroxy radical, and either the 5 or 6 position of the indole structure is occupied by hydrogen, have hitherto been unknown. Their production, which also forms part of the present invention, is effected by reacting a hydroxy-indole of Formula V,

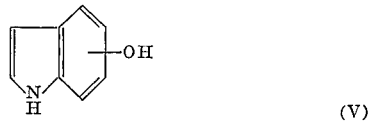

with formaldehyde and a secondary amine of Formula VI,

in which each of $R_3$ and $R_4$ signifies a lower alkyl radical of 1 to 4 carbon atoms, to obtain a compound of Formula VII,

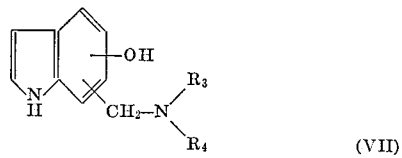

in which $R_3$ and $R_4$ have the above significance, the basic side chain being in the ortho position relative to the hydroxy radical and either the 5 or 6 position of the indole structure being occupied by hydrogen, and the basic side chain is then converted into a methyl radical by catalytic hydrogenation, e.g. in the presence of palladium in methanol.

The compounds of Formula I have hitherto not been described in the literature. The compounds of Formula I are useful because they possess pharmacological activity in animals. In particular, the compounds have a lasting bradycardiac effect and inhibit the tachycardia produced by Adrenalin or isoproterenol [1-(3,4-dihydroxyphenyl)-2-isopropylaminoethanol] as is shown by in vitro tests on the isolated guinea pig atrium and in vivo tests carried out on anaesthetized cats and dogs. In the latter in vivo tests, the compounds also inhibit the lowering of the blood pressure produced by isoproterenol. The compounds furthermore have an inhibiting effect of the hyperglycemia produced by Adrenalin and exert an influence on fat metabolism as is indicated by tests carried out on rats.

In general the compounds have a blocking effect on the β receptors of the sympathetic nervous system. Their effect is at least equal to that of known compounds having the same type of effects, but with regard to their cardiac effects they are characterized by a particularly suitable relation between the β adrenergic blocking activity and the negative inotropic activity. The compounds of the invention are useful in the prophylaxis and treatment of coronary illnesses (especially *Angina pectoris*), in the treatment of the hyperkinetic heart syndrome, hypertonic circulation regulation disorders, muscular hypertrophic subvalvular aortostensis and in the prophylaxis and treatment of the following heart rhythm disorders: sinus tachycardia, tachyarrhythmia in the case of auricular fibrillation, paroxysmal supraventricular tachycardia, ventricular extrasystole, ventricular tachycardia, arrhythmia caused by cardiac glucosides, tachyarrhythmia caused by hyperthyreosis, rhythm disorders in narcosis and local anesthesia.

For the above-mentioned use, the dosage administered will, of course, vary depending upon the compound employed, mode of administration and treatment desired. However, in general satisfactory results are obtained when administered at a daily dosage of from about 0.05 milligram to about 3 milligrams per kilogram of animal body weight, preferably given in divided doses 1 to 4 times a day or in sustained release form. For the larger mammals, the total daily dosage is in the range of from about 5 milligrams to about 200 milligrams, and dosage forms suitable for oral administration comprise from about 10 milligrams to about 50 milligrams of the compound admixed with a solid or liquid pharmaceutical carrier or diluent.

The new compounds or their water-soluble, physiologically tolerable acid addition salts may be used as pharmaceuticals on their own or in the form of appropriate medicinal preparations, e.g. tablets, dragées, suppositories or injectable solutions, for administration, e.g. enternally or parenterally.

In the following non-limitative examples all temperatures are indicated in degrees centigrade and are uncorrected.

EXAMPLE 1

4-{3-[(1-cyano-2-propyl)amino]-2-hydroxypropoxy} indole (racemates I and II)

7.3 g. of 4-hydroxy-indole and subsequently 4.5 cc. of racemic epichlorohydrin are added to a solution of 2.25 g. of sodium hydroxide in 50 cc. of water in an atmosphere of nitrogen while stirring. Stirring is continued at room temperature for 24 hours, the reaction mixture is extracted 4 times with methylene chloride, and the combined organic layers which have been dried over magnesium sulphate are concentrated by evaporation at reduced pressure.

8.8 g. of the oily residue are heated to the boil at reflux for 15 hours with 4.0 g. of racemic 3-aminobutyronitrile in 50 cc. of toluene. The mixture is subsequently evaporated to dryness at reduced pressure, the residue is shaken out thrice between ethyl acetate and a 1 N aqueous tartaric acid solution, and a 5 N sodium hydroxide solution is added to the combined tartaric acid phases until an alkaline reaction is obtained. Extraction is subsequently effected 4 times with methylene chloride, and the combined organic layers which have been dried over magnesium sulphate are concentrated by evaporation at reduced pressure. The oily residue is crystallized from ethyl acetate/ether and yields the racemate I of 4-{3-[(1-cyano- 2-propyl)amino]-2-hydroxypropoxy}indole in the form of needle druses having a M.P. of 95–97°.

Keller's colour reaction (0.2 mg.): dark green.

Van Urk's colour reaction (1 mg.): before exposure to light light violet, after exposure dark violet.

The mother liquor remaining after crystallization of the racemate I is concentrated by evaporation, and the residue is again crystallized from ethyl acetate. The resulting crystalline material is alternatively recrystallized from ethyl acetate, from chloroform and from ethanol, until the melting point of three successive crystallizations is constant. The resulting racemate II of 4-{3-[(1-cyano-2-propyl)amino]-2-hydroxypropoxy}indole has a M.P. of 86–88°.

Keller's colour reaction (0.2 mg.): blue green.

Van Urk's colour reaction (1 mg.): before exposure to light light violet, after exposure dark blue with violet tinge.

EXAMPLE 2

4-{(+)-3-[(1-cyano-2-propyl)amino] - 2 - hydroxypropoxy}indole (dextrorotatory mixture of diastereomers)

14.6 g. of 4-hydroxy-indole and subsequently 9.0 cc. of racemic epichlorhydrin are added to a solution of 4.5 g. of sodium hydroxide in 100 cc. of water in an atmosphere of nitrogen and while stirring. The mixture is stirred at room temperature for 24 hours, is extracted 4 times with methylene chloride, and the combined organic layers which have been dried over magnesium sulphate are concentrated by evaporation at reduced pressure.

13.5 g. of the oily residue are heated at reflux for 15 hours with 5.3 g. of (+)-3-aminobutyronitrile in 50 cc. of dioxane. The mixture is subsequently evaporated to dryness at reduced pressure, the residue is shaken out thrice between ethyl acetate and a 1 N aqueous solution of tartaric acid, and a 5 N sodium hydroxide solution is added to the combined tartaric acid phases until an alkaline reaction is obtained. Extraction is subsequently effected four times with methylene chloride, and the combined organic layers which have been dried over magnesium sulphate are concentrated by evaporation at reduced pressure. The 4-{(+)-3-[(1-cyano - 2 - propyl)amino]-2-hydroxypropoxy}indole obtained as oily residue crystallizes from ethyl acetate/ether in needle druses having a M.P. of 76–78°, $[\alpha]_D^{20}=+16.5°$ (c.=1 in methanol).

Keller's colour reaction (0.2 mg.): green, slowly turning darker.

Van Urk's colour reaction (1 mg.): dark violet.

EXAMPLE 3

4-{[(−)-3-(1-cyano-2-propyl)amino] - 2 - hydroxypropoxy}indole (levorotatory mixture of diastereomers)

This compound is produced from 4.5 g. of sodium hydroxide in 100 cc. of water, 14.6 g. of 4-hydroxyindole and 9.0 cc. of racemic epichlohydrin in manner analogous to that described in Example 2, whereby the oily intermediate is heated with (−)-3-aminobutyronitrile in dioxane.

The compound indicated in the heading has a M.P. of 79–81° (needle druses from ethyl acetate/ether). $[\alpha]_D^{20}=-16.2°$ (c.=1 in methanol).

Keller's colour reaction (0.2 mg.): green, slowly turning darker.

Van Urk's colour reaction (1 mg.): dark violet.

EXAMPLE 4

6-{3-[(1-cyano-2-propyl)amino]-2-hydroxypropoxy}indole (racemates I and II)

This compound is produced from 2.7 g. of sodium hydroxide in 60 cc. of water, 9.0 g. of 6-hydroxy-indole and 6.35 cc. of racemic epichlorhydrin and 3-aminobutyronitrile in manner analogous to that described in Example 2, whereby the oily intermediate is heated with racemic 3-aminobutyronitrile in dioxane, and the crude final product obtained after working up is crystallized from ethyl acetate. The resulting crystalline material is fractionally crystallized from chloroform, whereby the racemate I of 6-{3-[(1-cyano-2-propyl)amino]-2-hydroxypropoxy}indole having a M.P. of 115–118° is obtained.

Keller's colour reaction (0.2 mg.): sea blue.

Van Urk's colour reaction (1 mg.): dove blue.

The racemate II of the compound indicated in the heading is obtained from the mother liquors remaining upon crystallization of the racemate I and by frequent crystallization from ethyl acetate and chloroform; M.P. 83–85°.

Keller's colour reaction (0.2 mg.): dark blue.

Van Urk's colour reaction (1 mg.): dove blue.

EXAMPLE 5

4-{3-[(1-cyano-2-propyl)amino]-2-hydroxypropoxy}-5-methylindole

This compound is produced from 2.0 g. of sodium hydroxide in 50 cc. of water, 7.35 g. of 4-hydroxy-5-methylindole and 4.7 cc. of racemic epichlorhydrin in manner analogous to that described in Example 2, whereby the oily intermediate is heated with racemic 3-aminobutyronitrile in dioxane. The compound indicated in the heading is obtained as an oily product and is converted into its hydrogen oxalate, which crystallizes from ethanol in the form of druses having a M.P. of 130–133°. This product is one of the two possible racemic forms or a mixture thereof.

Keller's colour reaction (0.2 mg.): light blue with green tinge.

Van Urk's colour reaction (1 mg.): dark red.

The 4-hydroxy-5-methylindole used as starting material is produced by reacting 4-hydroxy-indole in alcoholic solution with one equivalent of an aqueous solution of dimethylamine and one equivalent of an aqueous solution of formaldehyde to give 5 - dimethylaminomethyl - 4-hydroxy-indole; the hydrogen oxalate of this compound has a M.P. of 156° with decomposition after crystallization from methanol. Hydrogenation of this compound in the presence of a palladium catalyst (5% on aluminum oxide) in methanol yields 4-hydroxy - 5 - methylindole (prisms having a M.P. of 126–131° after crystallization from benzene).

EXAMPLE 6

Galenical preparation: Tablets

| | G. |
|---|---|
| 4-{3-[(1-cyano-2 - propyl)amino] - 2 - hydroxypropoxy}indole (compound of Example 1) | 0.010 |
| Magnesium Stearate | 0.001 |
| Polyvinyl pyrrolidone | 0.004 |
| Talcum | 0.005 |
| Maize starch | 0.010 |
| Lactose | 0.128 |
| Dimethyl silicone oil | 0.0005 |
| Polyethylene glycol 6000 | 0.0015 |

For a tablet of 0.160

What is claimed is:

1. A compound of the formula:

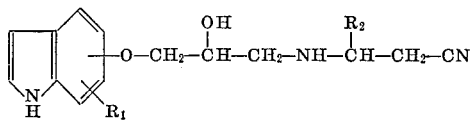

in which $R_1$ is hydrogen or methyl in the ortho position relative to the oxygen atom, either the 5 or 6 position of the indole structure being occupied by hydrogen when $R_1$ is methyl, and $R_2$ is lower alkyl of 1 to 4 carbon atoms, and a pharmaceutically acceptable acid addition salt thereof.

2. A compound according to claim 1, in which the compound is 4-{3-[(1-cyano-2-propyl)amino]-2-hydroxypropoxy}indole.

3. A compound according to claim 1, in which the compound is 4-{(+)-3-[(1-cyano-2-propyl)amino]-2-hydroxypropoxy}indole.

4. A compound according to claim 1, in which the compound is 4-{(−)-3-[(1-cyano-2-propyl)amino]-2-hydroxypropoxy}indole.

5. A compound according to claim 1, in which the compound is 6-{3-[(1-cyano-2-propyl)amino]-2-hydroxypropoxy}indole.

6. A compound according to claim 1, in which the compound is 4-{3-[(1-cyano-2-propyl)amino]-2-hydroxypropoxy}-5-methylindole.

References Cited
UNITED STATES PATENTS
3,328,417   6/1967   McLoughlin et al. ____ 260—307

ALEX MAZEL, Primary Examiner

J. A. NARCAVAGE, Assistant Examiner

U.S. Cl. X.R.

20—326.16; 424—274